Nov. 6, 1928.

G. LOWKRANTZ 1,690,739

LIGHT LOCK FOR PHOTOGRAPHIC FILM STRIPS

Filed Feb. 18, 1927

INVENTOR
GUNNE LOWKRANTZ.
BY
ATTORNEY

Patented Nov. 6, 1928.

1,690,739

UNITED STATES PATENT OFFICE.

GUNNE LOWKRANTZ, OF BINGHAMTON, NEW YORK, ASSIGNOR, BY MESNE ASSIGNMENTS, TO AGFA ANSCO CORPORATION, OF BINGHAMTON, NEW YORK, A CORPORATION OF NEW YORK.

LIGHT LOCK FOR PHOTOGRAPHIC FILM STRIPS.

Application filed February 18, 1927. Serial No. 169,378.

It has long been a problem of photographic manufacturers to adequately protect the edges of photographic film strips from becoming light struck or fogged when wound upon a film reel or spool. Many attempts have been made of one kind and another to eliminate this edge fog but without particular success and with the advent of the use of narrow strips of film for amateur motion picture cameras, this edge fog problem became more acute due to the fact that because of the small area of film available for the photographic image, the slightest amount of edge fog would extend into the picture areas.

I have by my invention solved this problem in a practical manner with the result that the objectionable edge fog may now be eliminated completely, and without the necessity of using bulky magazine covers or other extraneous and expensive appliances for reducing the possibility of fog.

I accomplish this purpose by the use of a leader strip attached to either end of the film strip, which leader strip is so formed as to effectively cut off all likelihood of light entering between the flanges of the film reel and the leader strip and thus strike the edges of the film.

I am aware that the use of leader strips of various kinds have been proposed and patented professing to prevent edge fog. These have taken the form of a leader strip of greater width than the film, leader strips with fluted or undulated edges, leader strips with the side edges folded over, and others. The difficulty with these has been that they are difficult to spool properly and difficult to wind through the camera, particularly a motion picture camera wherein the leader strip and film must pass through an exposure gate of a width adapted to admit the film width only.

By my invention, I provide a leader strip of the same width as the film but which is formed longitudinally irregular at predetermined points throughout its length whereby when the film is wound upon a reel, the leader strip surrounding the same will alternately engage with one or the other of the spool flanges at different points about the reel thereby effectively locking the light from the edges of the film strip. The irregularity of my improved leader strip is in practice so slight that such irregularities will not interfere in the least with the passage of the leader strip through the short gate of the camera.

Other objects and advantages by way of detail will be apparent as the description proceeds, reference now being had to the accompanying drawing wherein like reference numerals indicate like parts.

In the drawing:—

Figure 1:
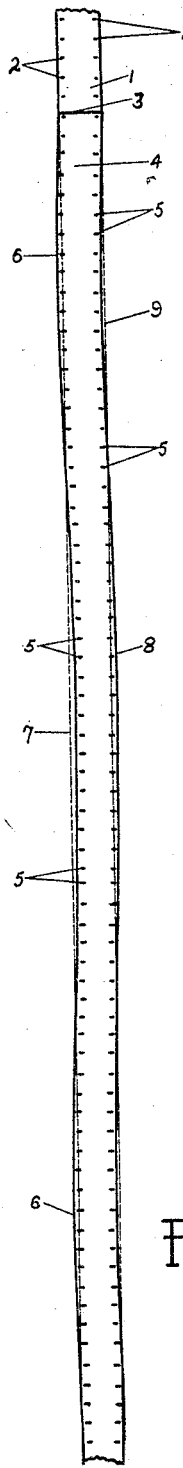
Figure 1 is a plan view of a portion of a length of my improved leader strip.

The reference numeral 1 refers to a strip of photographic film, in the form shown a strip of motion picture film, perforated as at 2, and to either end of which is secured as at 3, a leader strip 4 likewise perforated as at 5.

The side edges of the photographic film strip are of course parallel and straight, that is lying in the same vertical planes throughout their length. The side edges of the leader strip 4 are likewise preferably parallel (though they need not necessarily be so), but instead of being straight and keeping within the same vertical planes defined by the edges of the film strip, they are irregular with respect thereto, the leader strip thus forming a longitudinally irregular strip, sinuously curved, and the side edges thereof alternately crossing the straight vertical planes defined by the edges of the film strip.

This is clearly illustrated in Figure 1 where it is shown that at the points 6, the side edges of the leader strip extend laterally beyond the vertical plane of one side of the film strip 1, such plane being indicated by the dotted line 7, and at the points 8 the opposite side edge of the leader strip extends laterally beyond the vertical plane indicated by the dotted line 9 of the other side of the film strip. It will be noted that the "high points" of irregularity alternate from side to side. The curves defined by this irregular leader strip may be evenly spaced from each other although in some cases this may not be essential. It should also be understood that the degree of irregularity need only be very slight in order to accomplish the desired purpose, it having been found by practice that with 16 mm. film, a maximum lateral curve of $\frac{1}{16}$ of an inch is ample. The drawings have been purposely exaggerated somewhat in order to clearly illustrate the principle.

Figure 2:
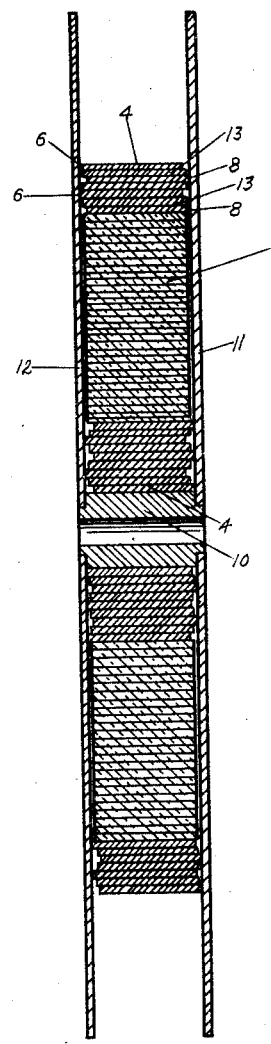
Figure 2 is a cross sectional view of a film reel illustrating the protection afforded by my leader strip.
Figure 3:
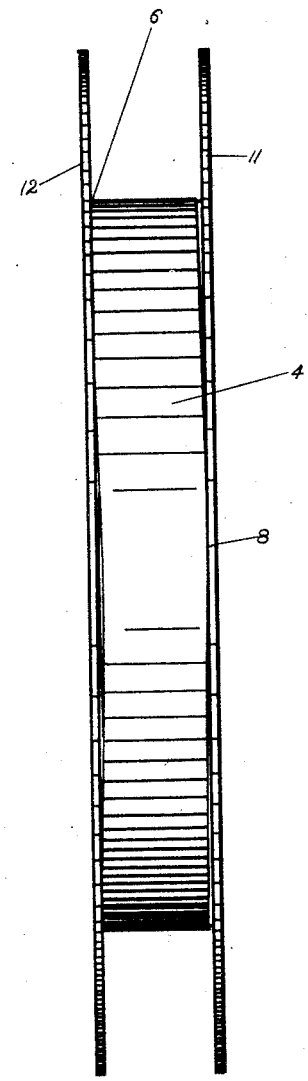
Figure 3 is a plan view of such a reel.

The result of this longitudinally irregular leader strip is illustrated clearly in Figure 2 of the drawing wherein is shown a film reel comprising the spool 10 and the side flanges 11 and 12 between which the film and leader strip are wound upon the spool.

It should be stated here that there is of course one of these leader strips attached to each end of the film strip 1 whereby the film is protected both before and after it is run through the camera. It should also be stated that preferably the perforations 5 of the leader strips follow the path of the irregularity of such strips, being at all times parallel with the side edges. This is preferable because otherwise such perforations would at certain points come too close to the edge thereby weakening the same. Under certain circumstances, of course, it might be possible to perforate such leader strips in straight lines.

Referring again now to Figure 2, it will be seen that there is first wound upon the spool 10, one of the leader strips 4 which because of its sinuous shape, engages alternately and at spaced intervals with the flanges 11 and 12. It will be understood that after the film has been wound from this reel onto another this leader strip 4 assumes its place on the outside of the roll which is the protecting position. It will be observed that in such position the "high points" 6 of the irregular leader strip engage with the flange 12 as spaced intervals and that the "high points" 8 on the opposite side of the leader strip engage at spaced intervals with the flange 11. It will be understood, of course, that at certain points about the periphery of the reel, the intermediate portions indicated at 13 become the "high points" of the leader strip and likewise alternately engage the flanges 11 and 12.

A length of leader strip should, of course, be provided sufficient to provide for one or more of the "high points" on each side edge of the film to engage with the flanges 11 and 12 at every point about the periphery of the reel. This is determined of course by the diameter of the reel. Likewise, the diameter of the reel and the length of leader strip determine the number of curves or irregularities in the leader strip.

The outer end of the leader strip may, of course, be secured to the reel or to the adjacent convolution by any suitable frangible seal, which will permit ready use of the leader strip for threading the same through the camera.

From the foregoing, it will be clear that I have provided an effective light lock for photographic film which comprises nothing more than a leader strip attached to the ends of the film, which is usually necessary in any event, and which differs from the ordinary leader strip in that it is longitudinally irregular, whereby when the leader strip is wound about the roll of film it overlies the edges of such film at spaced intervals, about the reel, engaging with the side flanges of the reel at such points, thereby protecting the edges of the film against light leaking past the inner face of the flanges and the edges of the leader strip.

It will be understood that changes may be made by way of detail without departing from the spirit and scope of my invention. I do not limit myself, therefore, to the exact form shown and described other than by the appended claims.

I claim:—

1. In combination with a strip of photographic film, a leader strip attached to an end thereof, said leader strip lying in substantially the same horizontal plane of said film strip and having its side edges at points intersecting the extended vertical planes of said film strip.

2. In combination with a strip of photograhpic film, a leader strip attached to an end thereof, the side edges of said leader strip being parallel and at points intersecting the extended vertical planes of said film strip.

3. In combination with a strip of longitudinally straight photographic film, a longitudinally serpentine leader strip having parallel edges attached to an end thereof.

4. In combination with a strip of photographic film having straight parallel side edges, a leader strip attached to an end thereof, the side edges of said leader strip being parallel and alternately overlying the side edges of said film strip.

5. In combination with a strip of photographic film, a leader strip attached to an end thereof, the parallel side edges of said leader strip defining a sinuously curved path, the points intersecting the extended vertical planes of the edges of the said film.

6. In combination with a strip of photographic film having perforations adjacent its side edges, a leader strip attached to an end of said film strip, said leader strip being longitudinally irregular, and perforations in said leader strip adjacent the side edges thereof, said perforations following the irregular path of said leader strip.

7. In combination with a strip of perforated motion picture film, a perforated leader strip of substantially the same width as said film attached to an end thereof, the parallel sides of said leader strip being longitudinally irregular with respect to and at points intersecting the extended vertical planes of the side edges of said film strip.

8. In combination with a strip of photographic film, a leader strip attached to an end thereof, the parallel side edges of said leader strip alternately crossing and extending laterally beyond the extended vertical planes defined by the side edges of said film strip.

9. A photographic film cartridge comprising a spool having parallel flanges at its ends, a leader strip wound about said spool, a strip of photographic film attached to the outer end of said leader strip and wound thereabout between said flanges, a second leader strip attached to the outer end of said film strip and wound thereabout, said leader strips being longitudinally irregular whereby the side edges thereof alternately engage with said flanges to prevent light reaching said film.

10. A photographic film cartridge comprising a spool having parallel flanges at its ends, a strip of photographic film wound thereon, a leader strip attached to the end of said film and wound thereabout, the side edges of said leader strip being so formed as to alternately engage said flanges whereby to prevent light reaching said film.

GUNNE LOWKRANTZ.